(12) United States Patent
Carlsgaard et al.

(10) Patent No.: US 7,102,692 B1
(45) Date of Patent: Sep. 5, 2006

(54) DIGITAL AND ANALOG TELEVISION SIGNAL DIGITIZATION AND PROCESSING DEVICE

(75) Inventors: Eric Stephen Carlsgaard, Zionsville, IN (US); Mark Francis Rumreich, Indianapolis, IN (US); John Sidney Stewart, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 803 days.

(21) Appl. No.: 10/089,904

(22) PCT Filed: Oct. 11, 2000

(86) PCT No.: PCT/US00/28059

§ 371 (c)(1),
(2), (4) Date: Apr. 3, 2002

(87) PCT Pub. No.: WO01/28255

PCT Pub. Date: Apr. 19, 2001

Related U.S. Application Data

(60) Provisional application No. 60/159,149, filed on Oct. 13, 1999.

(51) Int. Cl.
*H03M 1/12* (2006.01)
(52) U.S. Cl. .................... 348/572; 341/155
(58) Field of Classification Search ............... 348/572, 348/441, 554, 501, 521; 341/155, 158, 159, 341/160
See application file for complete search history.

(56) References Cited

U.S. PATENT DOCUMENTS

| | | | |
|---|---|---|---|
| 4,138,741 A | * | 2/1979 | Hedlund et al. ......... 369/44.26 |
| 5,367,337 A | | 11/1994 | Pyle et al. .................. 348/521 |
| 5,537,113 A | * | 7/1996 | Kawabata .................... 341/141 |
| 5,745,468 A | * | 4/1998 | Nakano .................... 369/59.19 |
| 5,808,691 A | | 9/1998 | Malcolm, Jr. et al. ...... 348/537 |
| 5,812,608 A | * | 9/1998 | Valimaki et al. ............ 375/331 |
| 6,014,366 A | * | 1/2000 | Ichiyoshi .................... 370/210 |
| 6,141,057 A | * | 10/2000 | Cooper et al. .............. 348/515 |
| 6,160,508 A | * | 12/2000 | Gustavsson et al. ........ 341/155 |

FOREIGN PATENT DOCUMENTS

| WO | 98/46027 | 10/1998 |
|---|---|---|
| WO | 99/46931 | 9/1999 |

* cited by examiner

*Primary Examiner*—Victor R. Kostak
(74) *Attorney, Agent, or Firm*—Joseph J. Laks; Robert D. Shedd; Paul P. Kiel

(57) ABSTRACT

A digital and analog television signal digitization and processing device that performs the digitization and processing functions using a common reference frequency source that is used to generate multiple subclock signals, wherein the reference frequency source is independent of any synchronizing characteristic of the input signal. For dual channel analog signal processing, the common frequency source is not locked to either channel/input signal. Digital signal processing is accomplished based on the same common reference frequency source. Advantageously, the present invention allows all of the analog-to-digital converters and decoder circuitry/logic necessary for simultaneously digitizing and processing several analog and digital television signals to be integrated on a single integrated circuit as well as eliminating duplicate frequency generation circuits.

7 Claims, 5 Drawing Sheets

DIGITAL AND ANALOG TELEVISION SIGNAL DIGITIZATION AND PROCESSING DEVICE

CROSS-REFERENCE TO RELATED APPLICATIONS

This application claims the benefit under 35 U.S.C. § 365 of International Application PCT/US00/28059, filed Oct. 11, 2000, which was published in accordance with PCT Article 21(2) on Apr. 19, 2001 in English; and which claims benefit of U.S. provisional application Ser. No. 60/159,149 filed Oct. 13, 1999.

BACKGROUND OF THE INVENTION (1) Field of the Invention

The present invention relates to devices for processing analog and/or digital signals, and more particularly, to integrated circuits that utilize multiple clock frequencies for digitizing and processing various analog and/or digital signals.

(2) Description of the Related Art

Integrated circuits, or ICs, are extensively used in all types of electronic devices. As these electronic devices become more complex, the number of ICs necessary to perform all of the required functions increases and/or the functions of several ICs are combined into a single IC. Even as multiple functions are consolidated into a single IC, it is desirable to reduce the internal complexity of the IC.

Current televisions use many different ICs for processing both analog and digital television signals from various terrestrial and non-terrestrial sources. The next generation of digital/analog televisions, however, will be expected to have even higher levels of integration than current televisions. Higher levels of integration translate into fewer ICs, wherein processes performed by several individual ICs are combined into one IC. However, various obstacles stand in the way of combining processing from analog television signal receivers with those required for digital television signals.

A problem with respect to integration of analog and digital television signal processing ICs is that different sources of video (both analog and digital) may require analog-to-digital (A/D) converters to be run at different sampling rates. Analog television signals are based on line-locked or chroma sub-carrier-locked frequencies, while digitally modulated (digital) television signals are based on their own symbol rates. Also, present A/D technology produces digital crosstalk that adversely affects A/D performance when asynchronous clocks are present.

It is known to use stand-alone digital demodulators using digital interpolation for off-frequency operation. Also, second channel processing for analog signals has been accomplished with an asynchronous sample frequency. In the latter case, however, the main channel is locked to a parameter of the incoming analog television signal, such as horizontal sync pulses or color burst.

BRIEF SUMMARY OF THE INVENTION

The present invention is a single system IC that performs simultaneous digitization and processing of multiple analog and/or digital signals, using a common frequency source that is not locked to a parameter of the incoming signal. Thus, high performance sampling and processing of all incoming signals may be achieved.

The present invention provides for standard analog video decoding for two channels using a single reference frequency (reference clock) that is not locked to either system. That is, the reference clock is not based on, or locked to, a lockable characteristic of either input signal. Two digital signal processors, for satellite and terrestrial television signals, are modified to perform processing based on the same reference frequency. The present invention provides synchronous frequency operation of all A/Ds and digital signal processors of the multiple channels to prevent erroneous sampling and processing of the incoming signal.

In one form of the invention, a single reference clock of a particular frequency is input to a clock generator that generates all of the operational frequencies (clock signals) needed by the A/D converters and decoding circuitry/logic on the IC. The reference clock is independent, e.g., is not locked to, any synchronizing characteristic of the input signals.

Since there is only one reference clock from which all the other sampling and processing frequencies are generated, the A/Ds will be able to operate with high performance, up to 10-bit accuracy, with little to no digital noise. This is generally not possible with asynchronous sampling frequencies because "quiet zones", needed for sampling the analog input, no longer exist. However, with the multiple sampling frequencies based on a single reference clock (frequency) of the present invention, these quiet zones between digital transitions are preserved.

One circuitry/logic section of the present IC that processes satellite (digital) broadcast television signals, uses an interpolator to process an incoming signal at an appropriate symbol rate related frequency (e.g. 40 MHz) even though the actual samples may be taken at a different frequency (e.g. 54 MHz). A similar procedure is used for terrestrial digital or vestigal sideband (VSB) television signals where twice the symbol rate is an appropriate frequency (e.g. 21.54 MHz) while the sampling frequency (clock signal) is greater than the particular frequency (e.g. 27 MHz). Analog television signal processing is also accomplished at a particular frequency (e.g. 18 MHz) for each channel. Even though the analog television signal samples are not locked to the incoming line rate, the horizontal frequency is determined with sub-sample accuracy for each channel. A final sample rate converter has a frequency (e.g. 27 MHz) that corresponds to a frequency for luma (e.g. 13.5 MHz) plus a frequency for each of the color difference signals (e.g. 6.75 MHz). This provides non-jittering lines of data output. Additionally, a chroma demodulator of the present IC uses a digital discrete-time oscillator (DTO) that is locked to the incoming chroma burst signal for each of the incoming signals. Thus, all of the digital processing is achieved using synchronous clocks in spite of the asynchronous character inherent in the various processing sections of circuitry/logic, such as by four types of television signal systems.

The present invention also achieves dual use of much of the digital circuitry in the dual NTSC signal processing section. The digital color decoder (DCD) performs all of the necessary signal processing functions for decoding NTSC video including comb filtering for separating luma and chroma, chroma demodulation for generating the color difference signals, synchronizing (sync) signal separation, sample rate conversion (SRC) to a standard interface frequency, and vertical blanking interval (VBI) data slicing. The VBI typically includes closed caption, "V-chip" parental control/rating information, program guide, teletext data, and the like. All of these functions are included for both the main channel video and the second channel video, which is usually used for picture-in-picture (PIP).

In accordance with another aspect of the present invention, the DCD combines the two channels, duplicating only the actual data storage components required for the two channels, and uses the same circuits for most of the processing by running at twice the required sampling/clock frequency and switching channels on every clock cycle. Thus, for example, each 18 MHz channel is processed on every other clock cycle at 36 MHz.

In another form, the present invention includes an analog signal processing section and a clock generator. The analog signal processing section is operable to process analog signals having a synchronizing component, such as a horizontal sync pulse or the like. The clock generator is operable to produce internal clocking signals based on an external reference signal for use by the analog signal processing section, wherein the external reference signal is independent of the synchronizing component of the analog signals.

In another form, the present invention includes an analog signal processing section, a digital signal processing section, a first A/D converter associated with the analog signal processing section, and a second A/D converter associated with the digital signal processing section. The integrated circuit further includes a clock generator operable to provide first and second clock signals for the first and second analog-to-digital converters respectively from a single reference clock signal, wherein the first and second clock signals provide synchronous operation of the first and second analog-to-digital converters.

In yet another form, the present invention includes an analog signal processing section, a digital signal processing section, and a clock generator. The clock generator is operable to produce multiple clock signals of different frequencies for use by the analog and digital processing sections, wherein the clock generator uses a single reference clock signal of a given frequency that is independent of any synchronizing characteristic of the input analog and/or digital signal. The analog and digital signal processing sections process their respective analog and digital signals simultaneously.

The present invention is described with reference to the accompanying drawings, wherein:

BRIEF DESCRIPTION OF THE DRAWINGS

Corresponding reference characters indicate corresponding parts throughout the several views.

DETAILED DESCRIPTION OF THE INVENTION

Figure 1:
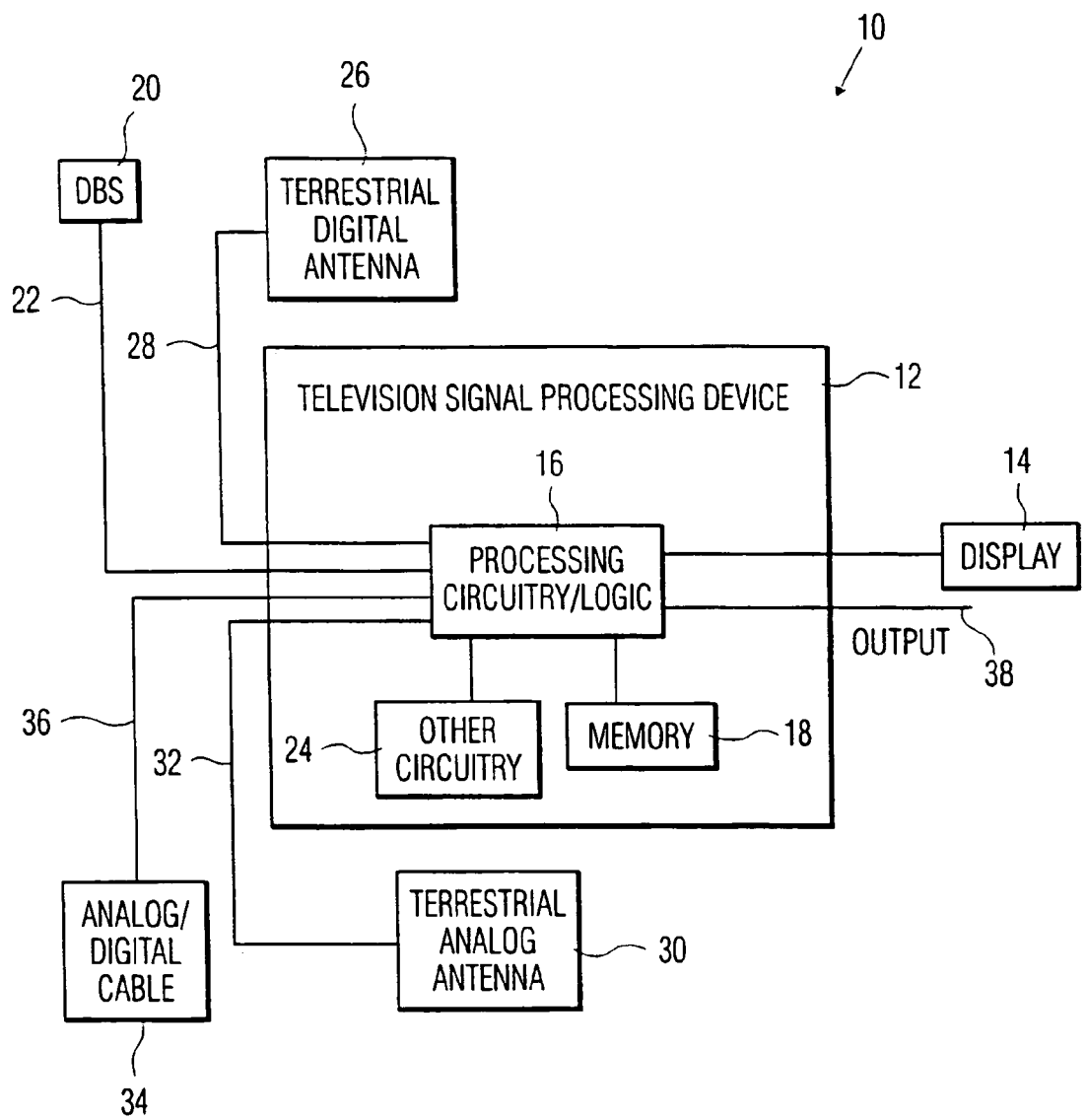
FIG. 1 is a block diagram of an exemplary system in which the present IC may be used.

With reference to FIG. 1 there is depicted a block diagram of a system 10 suitable for using an IC according to the present invention. System 10 comprises a plurality of integrated circuits (ICs) for signal and/or data and information processing, wherein at least one IC requires multiple clocks, clock frequencies, or clock/clocking signals for proper functioning. This type of IC may be termed a multiple clock IC. It should be appreciated that system 10 is an exemplary environment/application utilizing the present multiple clock IC. The multiple clock IC of system 10, in accordance with the principles set forth herein, may take many forms and/or perform many functions as is known to those skilled in the art.

In system 10, the multiple clock IC performs television signal processing for a variety of television signal formats from a variety of sources. Briefly, the multiple clock television signal processor IC incorporating the present invention is adapted/operable to process digital satellite television signals, terrestrial (including cable distribution) digital television signals, and terrestrial (including cable distribution) analog television signals. These analog and digital signals may be provided in various encoding schemes and/or modulation schemes.

System 10 includes television signal processing device 12, which may be a television apparatus, a set-top box, or the like (collectively "television apparatus"). Television signal processing device 12 includes processing circuitry/logic 16 for decoding a received television signal. Processing circuitry/logic 16 is operable to decode and process digitally modulated analog audio and video television signals or transmissions ("digital television signals") from Direct Broadcast Satellite (DBS) system 20 modulated using for example, QPSK (Quadrature Phase Shift Keying) modulation/encoding format. Processing circuitry/logic 16 is also operable to decode and process digital television signals from terrestrial Digital Television (DTV) antenna 26. Such television signals may be digitally modulated using a VSB (Vestigal SideBand) modulation/encoding format.

Processing circuit/logic 16 is also operable, to process analog audio and video television signals ("analog television signals") from terrestrial analog antenna 30 received via a signal path or line 32, as well as analog television signals from CATV (cable television) system 34. The modulation/encoding format of the analog television signals is typically NTSC, but other formats may be used. The processing of analog television signals typically includes digitizing the input signals through appropriate circuitry, software, and/or other components. Digital television signals from CATV system 34 may also be decoded and processed. It should be appreciated that television apparatus 12 is adapted to receive and process analog and/or digital television signals from sources other than that shown.

Television signal processing device 12 also typically includes memory 18, which includes stored program instructions (i.e. software) for controlling the operation of television signal processing device 12. Circuitry/logic 24 is provided for other functionality of television signal processing device 12, which functionality is not necessary for understanding or practicing the present invention, and will not be described in detail.

System 10 also includes display 14 that is coupled to processing circuitry/logic 16, and suitable for displaying the video portion of the television signal (and any OSD thereof). In the case of a set-top box, or the like, display 14 is associated with a display of an attached television set. Output 38 may also be provided to supply audio and/or video from processing device 12 to another device including a video recorder and the like.

Television signal processing device 12 may be an analog/digital television including, but not limited to DTV-320 HDTV (High Definition Television) manufactured by Thomson Consumer Electronics, Inc. of Indianapolis, Ind., a digital television such as a high definition digital television (HDTV), a set-top box capable of utilizing analog/digital television signals, a television signal storage device, or any other device that can process various forms of television signals.

Figure 2:
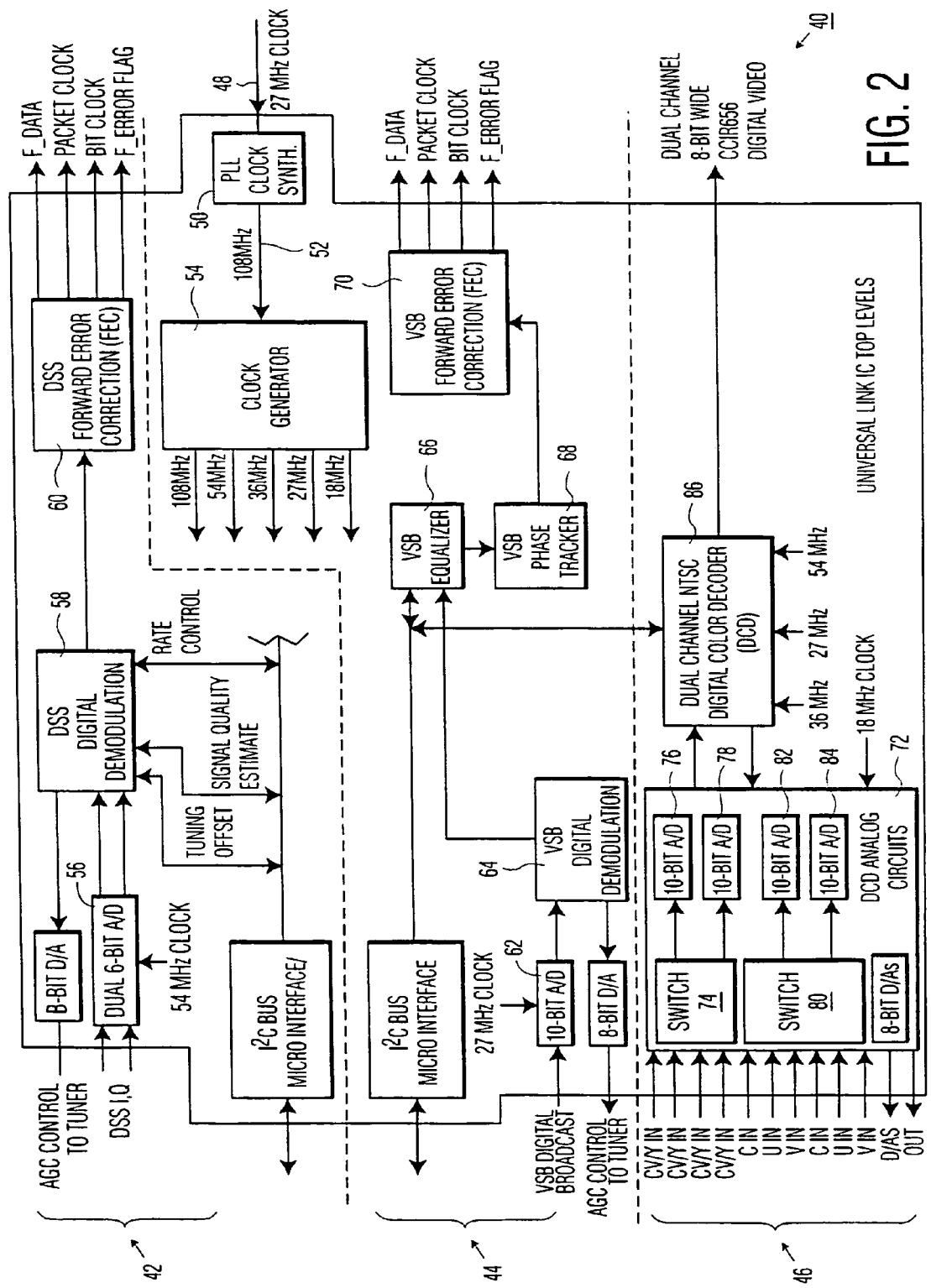
FIG. 2 is a block diagram of the IC used in the exemplary system of FIG. 1, incorporating an embodiment of the present invention.

In accordance with an aspect of the present invention, at least one of the plurality of ICs in system 10 is a multiple clock IC. The multiple clock IC utilized in processing circuitry/logic 16 of television apparatus 12, is known as a Universal Link IC, and is illustrated in FIG. 2. Universal link IC 40 is an integrated circuit of mixed signal design, i.e. it has both analog and digital television signal processing circuitry, and incorporates, or integrates, several television signal processing functions into a single IC.

Referring to FIG. 2, there is shown a block diagram of Universal Link Universal Link IC 40 used in television apparatus 12. The multiple clock signals of different frequencies are generated by Universal Link IC 40 using a single externally generated reference clock signal of a given frequency. Universal Link IC 40 includes I/O pin 48 that receives the externally generated reference clock signal. In the present embodiment, Universal Link IC 40 uses an externally provided 27 MHz reference clock signal. Other external reference clock signal frequencies may be used in accordance with the principles set forth herein.

Notably, the external reference clock signal is not based on, or locked to, any lockable characteristic, such as a sync pulse or color burst, of an incoming television signal (either analog or digital). Rather, the external reference clock signal is chosen to provide easy multiplication and division thereof for generating clock signals of appropriate frequencies to accommodate the clocking signal frequency requirements of the various sections or blocks of circuitry/logic of Universal Link IC 40.

In Universal Link IC 40, the external reference clock signal is provided to Phase Locked Loop (PLL) synthesizer 50, which produces an output clock signal of a given frequency on output/line 52. Here, the PLL output clock signal is chosen to be 108 MHz and may be considered an internal reference clock signal. All remaining required clock signals are generated from this internal reference clock signal.

The 108 MHz internal reference clock signal is provided to clock generator 54, which contains the appropriate circuitry/logic to generate multiple clock frequencies. The actual number of clock signals produced by clock generator 54 is dependent upon the clock signal requirements of the particular IC. In Universal Link IC 40, clock generator 54 produces four (4) clock signals of different frequencies and one (1) clock signal of the same frequency as the internal reference clock signal. Each generated clock signal is then routed to the appropriate section or block of circuitry/logic.

In accordance with the present invention, the internal IC reference clock frequency generated by PLL clock synthesizer 50 is a multiple of the external reference clock frequency. More particularly, the internal IC reference clock frequency is preferably a whole number multiple of the external reference clock frequency. The internal IC reference clock frequency is also chosen such that it can be divided into the plurality of IC clock signals or frequencies that are usable by the various sections or blocks of circuitry/logic.

In the present case, the internal reference clock signal frequency is 108 MHz, which is four (4) times the external reference clock signal frequency of 27 MHz. Clock generator 54 then produces a 54 MHz clock signal, which is one-half (½) of the 108 MHz internal IC clock signal, a 36 MHz clock signal, which is one-third (⅓) of the 108 MHz internal IC clock signal, a 27 MHz clock signal which is one-fourth (¼) of the 108 MHz internal IC clock signal and an 18 MHz clock signal which is one-sixth (⅙) of the 108 MHz internal IC clock signal. Therefore, clock generator 54 generates 4 subclocks that are subharmonics of the master internal clock with no phase shift.

Another factor in determining the frequencies of internal clock signals is the sampling rates, or the clocking rates, for the various sections or blocks of circuitry/logic of Universal Link IC 40. As indicated above, Universal Link IC 40 includes three main sections. The three main sections are: "Satlink" section 42, which is operable to receive and demodulate/decode satellite transmitted television signals; "VSB (Vestigal SideBand) link" section 44 which is operable to receive and demodulate/decode terrestrially transmitted general digital and/or digital high definition (HDTV) signals; and "DCD" (Digital Color Decoder) section 46, which is a block of circuitry/logic that is operable to provide switching, chroma demodulation, and other signal processing of NTSC (analog) signals. Universal Link IC 40 provides several separate decoding/demodulation systems, including a first system for a main analog television signal, a second system for an auxiliary analog television signal (such as PIP or picture-in-picture and/or POP or picture-on-picture), a third system for digital satellite television signals, and a fourth system for digital terrestrial television signals. Sections 42, 44, and 46 operate independently and in parallel. Because of the nature of the various signals, various portions of circuitry/logic of the sections or blocks of circuitry/logic require different clocking or sampling frequencies.

Satlink section 42 accepts an I, Q input into an appropriate "x-bit" A/D converter. In particular, the I and Q inputs are provided to into a dual 6-bit A/D converter 56 that is clocked or sampled using the 54 MHz clock signal. Demodulation block 58 and Forward Error Correction (FEC) block 60 further process the satellite broadcast digital television signal. In particular, demodulation block 58 and FEC block 60 uses an interpolator to process the satellite broadcast (digital) signal at an appropriate symbol rate related frequency for the satellite broadcast digital television signals. In the present case, the appropriate symbol rate frequency is 40 MHz. The dual 6-bit A/D converter 56, however, utilizes the 54 MHz IC clock signal to clock or sample (oversample) the incoming television signal, even though it requires only a 40 MHz clock or sampling signal. The 54 MHz clock provides a thirty-five percent (35%) increase in clock or sampling frequency over the clock or sampling frequency required.

Similar to Satlink section 42, VSB section 44 receives the VSB digital broadcast television signal through an appropriate "x-bit" A/D converter. VSB section 44 receives the VSB signal through 10-bit A/D converter 62 that is clocked with the 27 MHz clock signal. Demodulation block 64, equalizer block 66, phase tracker block 68, and Forward Error Correction (FEC) block 70 further process the terrestrial broadcast digital television signal. In particular, demodulation block 64, equalizer block 66, phase tracker block 68, and FEC block 70 processes the VSB signal at twice a symbol rate related frequency for the VSB (i.e. terrestrial) broadcast digital television signals. In the present case, the appropriate symbol rate frequency is 10.77 MHz, so twice the appropriate symbol rate frequency is 21.54 MHz. The 10-bit A/D converter 62, however, utilizes the 27 MHz IC clock signal to clock or sample (oversample) the incoming television signal, even though it requires only a 21.54 MHz clock or sampling signal. The 27 MHz clock provides an approximately twenty-five percent (25%) increase in clock or sampling frequency over the sampling frequency required.

In DCD section 46, the analog sampling is accomplished using the 18 MHz clock signal for each channel of the analog television signal. Even though these samples are not locked to a characteristic of the input television signal, this horizontal frequency is determined with sub-sample accuracy for each channel. DCD section 46 is operable to receive two analog television signals (i.e. one for the main channel and the other for the PIP or POP) at DCD analog circuits section 72. The four (4) CV/Y signals thereof are input into switch 74 that appropriately sends the signals to two 10-bit A/D converters 76 and 78. The two sets of separate C, U, and V INS thereof, are input into switch 80 that appropriately sends the signal to two 10-bit A/D converters 82 and 84. The outputs of these four 10-bit A/D converters 76, 78, 82, and 84 are input into dual channel NTSC digital color decoder 86. The final sample rate convertion is accomplished at 27 MHz (sequential 13.5 MHz for luma and 6.75 MHz for each of the color difference signals. This provides non-jittering lines of data output. In addition, the chroma demodulator uses a digital discrete time oscillator (DTO) that is locked to the incoming chroma burst signal for each of the incoming signals.

All of the A/D processing and digital signal processing is accomplished using synchronous clocks in spite of the asynchronous character inherent in these four signaling systems. Also, each IC clock signal frequency generated by clock generator 54 is equal to or greater than the clock/sampling signal frequency required for proper operation of the appropriate portion of the circuitry/logic. Such oversampling may be accommodated for later in the processing of the particular signal. Undesirable effects generated by the synchronous operation of the A/Ds and signal processor sections may be compensated for by the chroma demodulation sections 102 and 104, and SRC and synch processors 110 and 112. The techniques for removing such effects are well known to those skilled in the art and will not be discussed in detail here.

Figure 3:
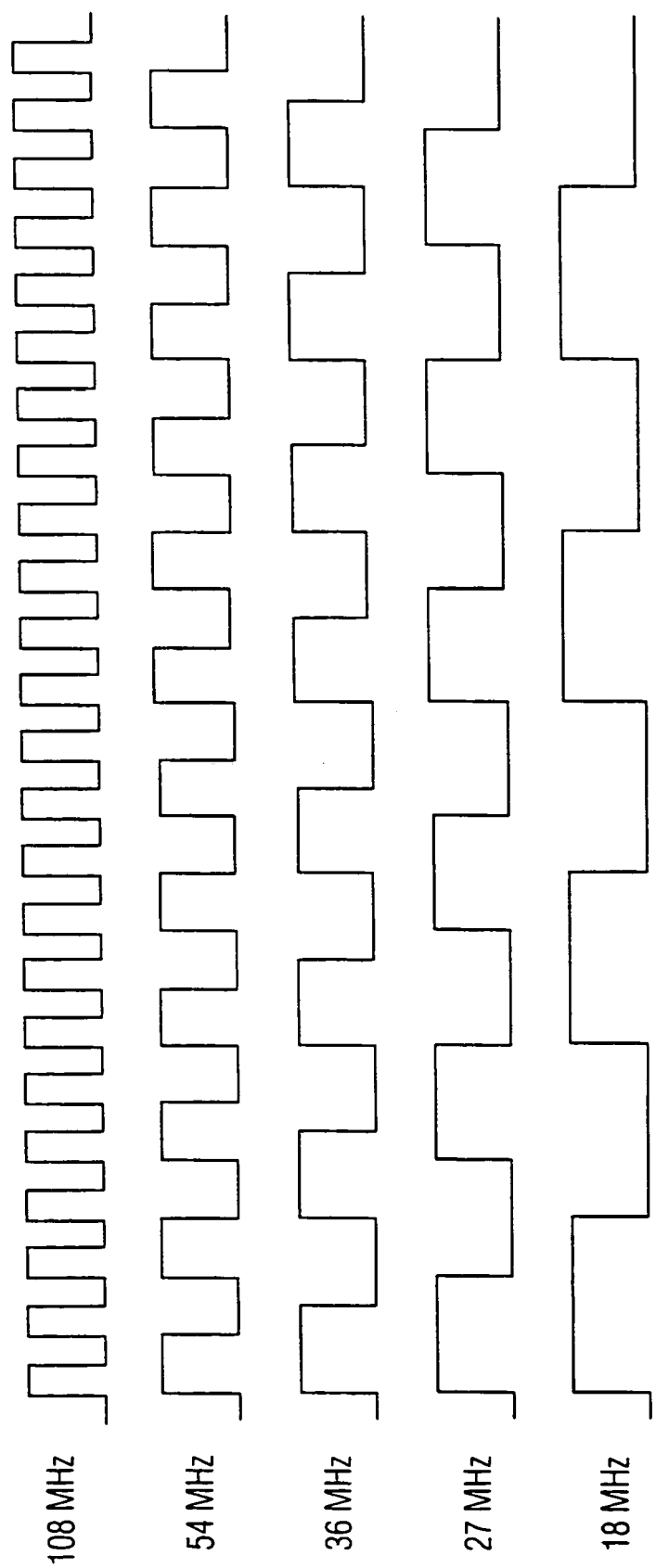
FIG. 3 is a chart showing the various digital frequencies used in the IC of FIG. 2.

Since there is only one reference clock signal from which all of the other sampling and processing frequencies are generated, the A/Ds will be able to operate with high performance (i.e. up to 10-bit accuracy) and have little to no digital noise. This not possible with asynchronous sampling frequencies because the "quiet zones" needed for sampling the analog signal no longer exist. However, with multiple sampling frequencies based on the same clock, the quiet zones between digital transitions are preserved. (see FIG. 3).

Figure 4:
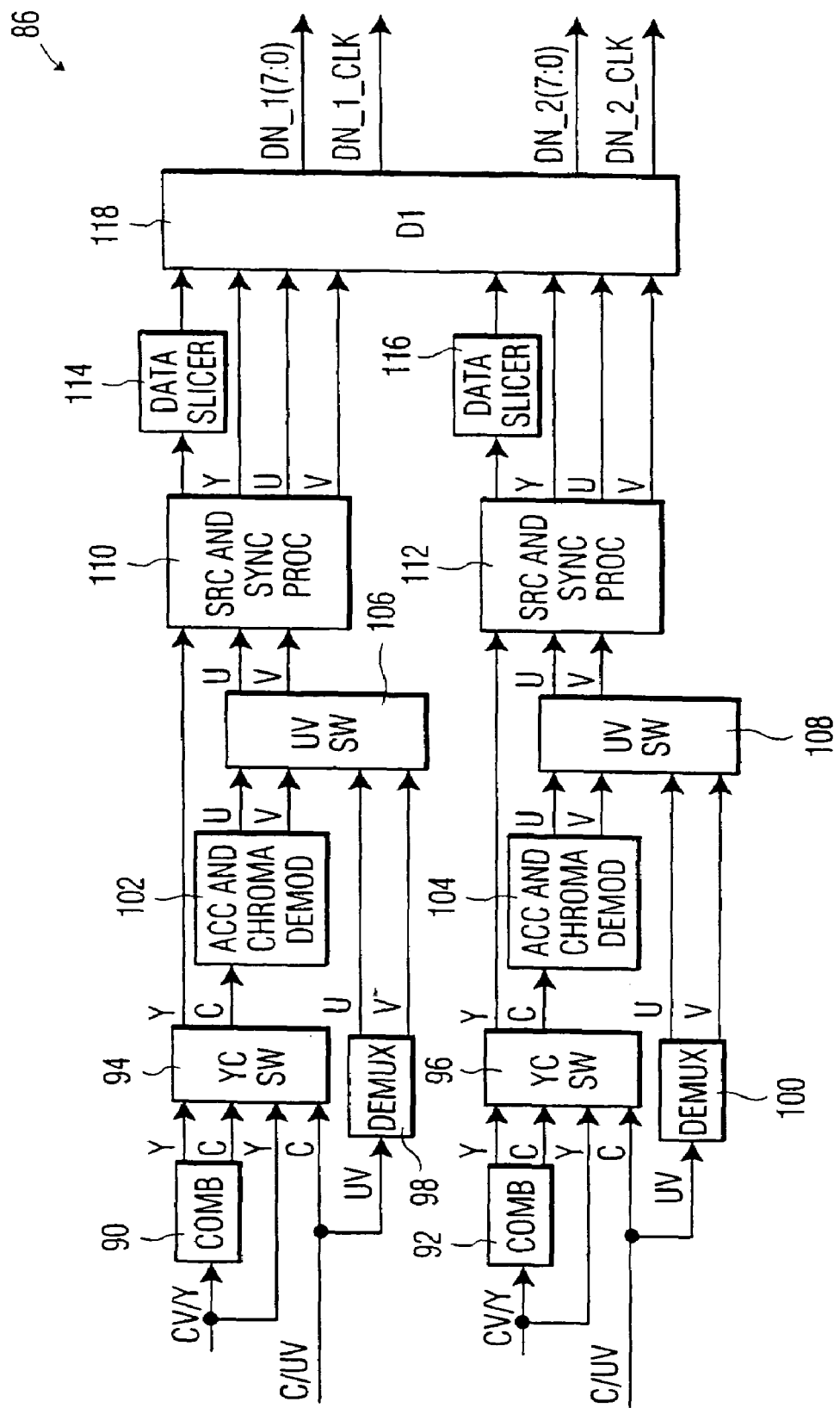
FIG. 4 is a block diagram of the digital color decoder of the IC of FIG. 2.

Another aspect of the present invention is the dual use of portions of the digital circuitry for processing NTSC television signals. In this regard, reference is made to FIG. 4, which depicts a block diagram of DCD block 86. DCD block 86 performs all of the necessary signal processing functions for two NTSC (analog) television signals. DCD block 86 includes dual comb filters 90 and 92 for separating luma and chroma from the two incoming analog television signals which are input into respective luma and chroma switches 94 and 96. The respective luma and chroma switches 94 and 96 are each clocked at 36 MHz (twice the required frequency of 18 MHz for a single channel) such that each channel's chroma and luma components are switched on every clock. Thus, each 18 MHz channel is processed on every other clock cycle at 36 MHz.

The chroma components are input to respective ACC and chroma demodulation blocks 102 and 109. The UV components are meanwhile forwarded to demultiplexers 98 and 100 to obtain respective, separate U and V components. The U and V outputs of the chroma demodulation modules 102 and 104 (color difference signals) are combined with the U and V outputs of the respective demultiplexers 98 and 100 in respective UV switches 106 and 108, which again are clocked at 36 MHz (twice the required frequency of 18 MHz for a single channel) such that each channel's chroma and luma components are switched on every clock. Thus, each 18 MHz channel is processed on every other clock cycle at 36 MHz.

The luma and UV components are forwarded to respective sample rate converters and synchronizing (sync) signal separation blocks 110 and 112 to produce a signal having a standard interface frequency. Additionally, vertical blanking interval (VBI) data slicing is accomplished by data slicers 114 and 116 wherein closed caption, "v-chip" parental control information, teletext data, program guide information, and the like, is obtained. Outputs of the respective sample rate converters and sync processors 110 and 112, and the respective data slicers 114 and 116 are input to video processor 118 to supply the main channel video and second (auxiliary) channel video. The second channel video is typically used for PIP or POP. As noted earlier, undesirable effects of using a single reference clock are compensated for in chroma demodulation sections 102 and 104, and SRC and sync processors 110 and 112.

Figure 5:
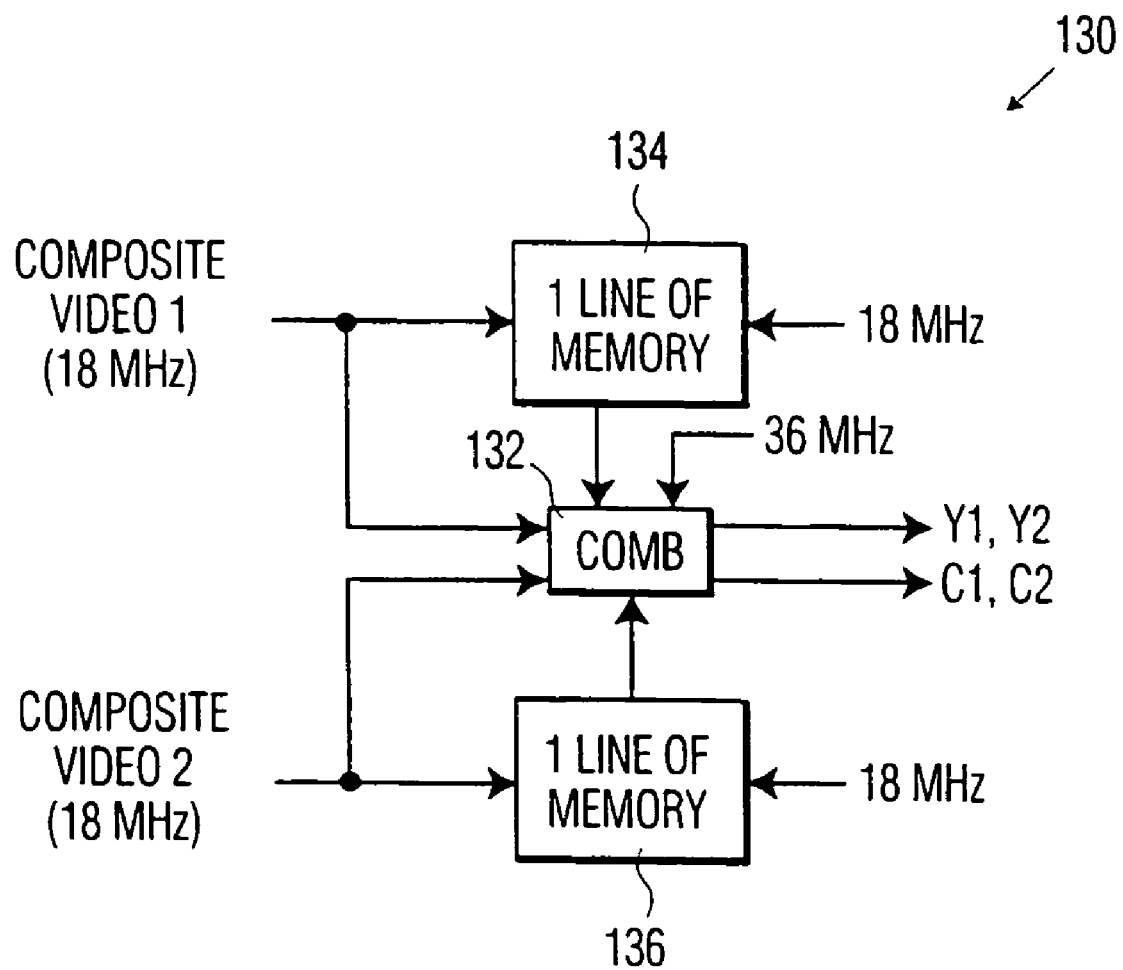
FIG. 5 is a block diagram of a comb filter implementation of the IC of FIG. 2.

With reference to FIG. 5, there is shown a block diagram, generally designated 130, of the comb filter implementation with dual use of much of the logic circuits of DCD block 86 in accordance with an aspect of the present invention. The first composite video of a clocking or sampling frequency of 18 MHz is input into a data storage device 134 holding one line of the video and into a comb filter 132. At the same time, the second composite video of a clocking or sampling frequency of 18 MHz is input into a data storage device 136 holding one line of the video and into the comb filter 132. Data storage devices 134 and 136 are each clocked at the sampling rate of 18 MHz. Comb filter 132 is clocked at twice 18 MHz or at 36 MHz. In this manner, comb filter 132 alternatively processes the output of data storage devices 134 and 136.

Thus, instead of two completely different circuits, DCD block 86 combines the two channels, duplicating only the actual data storage components. DCD block 86 also uses the same circuits for most of the processing by operating at twice the required frequency and switching channels on every clock.

While this invention has been described as having a preferred design and/or configuration, the present invention can be further modified within the spirit and scope of this disclosure. This application is therefore intended to cover such departures from the present disclosure as come within known or customary practice in the art to which this invention pertains and which fall within the limits of the appended claims. In particular, the present invention is applicable to other circuits where there are prerequisites to operate systems with different frequency requirements, where it is desired to operate the systems/circuits on the same silicon space, especially those with A/Ds and other analog circuits, in addition to the digital circuitry/logic.

The invention claimed is:

1. A signal processing apparatus, comprising:
   first and second signal inputs for receiving first and second input signals having respective synchronizing characteristics;

a first clock generator for generating a reference clock signal, the reference clock signal being independent of the synchronizing characteristics of the first and second input signals;

a second clock generator, coupled to the first clock generator, for producing a plurality of further clock signals in response to the reference clock signal; and a signal processing section, coupled to the first and second signal inputs and the second clock generator, for sampling and processing the first and second input signals in accordance with a sampling rate and an appropriate signal standard, the signal processing section having a plurality of analog to digital (A/D) converters that are clocked by respective ones of the plurality of further clock signals, the A/D converters being clocked by respective ones of the plurality of further clock signals, which are independent of the synchronizing characteristics of the first and second input signals and have a frequency substantially equal to the sampling rate, wherein the signal processing section processes the first and second input signals using a single processing channel, the single processing channel being clocked by a further clock signal that has a signal frequency of at least twice the required clocking speed necessary for processing a single one of the first and second input signals.

2. The signal processing apparatus of claim 1, wherein the first and second input signals are television signals.

3. The signal processing apparatus of claim 1, wherein the signal processing section is further operable to process a digital input signal having a synchronizing characteristic, and the reference clock signal is independent of the synchronizing characteristic of the digital input signal.

4. A television apparatus, comprising:

first and second signal inputs for receiving first and second television signals having respective synchronizing characteristics;

a first clock signal generator for producing a reference clock signal that is independent of the synchronizing characteristics of the first and second television signals;

a second clock signal generator, coupled to the first clock signal generator, for producing a plurality of further clock signals in response to the reference clock signal;

a signal processor, coupled to the signal inputs and the second clock signal generator, for sampling and processing the first and second television signals in accordance with appropriate signal standards and providing output signals suitable for display on a display device, the signal processor including a plurality of analog to digital (A/D) converters coupled to the second clock signal generator; and an signal output, coupled to the signal processor, for receiving and coupling the output signals to a display device, the A/D converters of the signal processor being clocked by respective ones of the plurality of further clock signals, which are independent of the synchronizing characteristics of the input signals, and have a frequency substantially equal to the sampling rate, wherein the signal processing section decodes the first and second television signals using a single processing channel, and the single processing channel is clocked by a clock signal that has frequency of at least twice the required clocking speed necessary for processing a single one of the television signals.

5. A method for processing input signals having synchronizing components, the method comprising the steps of:

receiving first and second input signals having respective synchronizing components;

generating a reference clock signal, the reference clock signal being independent of the synchronizing characteristics of the first and second input signals;

generating a plurality of further clock signals based on the reference clock signal;

converting the first and second input signals into corresponding first and second digital signals using analog to digital (A/D) converters that are clocked using one of the plurality of further clock signals; and decoding the converted digital signals in accordance with appropriate television signal standards using decoding circuitry/logic to provide output signals suitable for display, the decoding circuitry/logic being clocked by at least one of the plurality of further clock signals, wherein the decoding is performed using a single processing channel that is clocked by an internal clock signal that has a frequency of at least twice the required clocking speed necessary for processing a single input signal the A/D converters being clocked by respective ones of the plurality of further clock signals, which are independent of the synchronizing characteristic of the input signal and having a frequency substantially equal to the sampling rate.

6. The method according to claim 5, wherein the receiving step further comprises receiving a digital input signal having a synchronizing characteristic, and the decoding step further comprises decoding the digital input signal using decoding circuitry/logic that is clocked by a respective one of the internal clock signals that is independent of the synchronizing characteristic of the digital input signal.

7. The method according to claim 5, wherein the receiving step comprises receiving an analog television signal.

* * * * *